United States Patent [19]

Segawa

[11] Patent Number: 5,023,912
[45] Date of Patent: Jun. 11, 1991

[54] PATTERN RECOGNITION SYSTEM USING POSTERIOR PROBABILITIES

[75] Inventor: Hideo Segawa, Tokyo, Japan

[73] Assignee: Kabushiki Kaisha Toshiba, Kawasaki, Japan

[21] Appl. No.: 331,287

[22] Filed: Mar. 31, 1989

[30] Foreign Application Priority Data

Mar. 31, 1988 [JP] Japan .................................. 63-78827

[51] Int. Cl.$^5$ .............................................. G01L 7/08
[52] U.S. Cl. ..................................................... 381/43
[58] Field of Search .................................. 381/41–46; 364/513.5

[56] References Cited

U.S. PATENT DOCUMENTS 4,905,287 2/1990 Segawa .................................. 381/43

OTHER PUBLICATIONS

The 9th ICPR proceedings; pp. 1225–1229; entitled "A Similarity Value Transformation Method for Probabilistic Scoring"; Hideo Segawa & Teruhiko Vkita (1988).
"A Speaker Independent Recognition Algorithm for Connected Word Using Word Boundary Hypothesizer"; pp. 1077–1080; T. Ukita, T. Nitta and S. Watanabe (1986).
"The Distribution of Similarity Values in the Multiple Similarity Method"; pp. 1–10; Hideo Segawa (1987).

Primary Examiner—Gary V. Harkcom
Assistant Examiner—Michelle Doerrler
Attorney, Agent, or Firm—Oblon, Spivak, McClelland, Maier & Neustadt

[57] ABSTRACT

A pattern recognition system includes a feature extracting section for extracting a feature of an input pattern, a memory section for storing a reference pattern for each category, a similarity calculation section for calculating a similarity between the feature obtained by the feature extracting section and the reference pattern stored in the memory section, and a posterior probability transformation section for transforming the similarity calculated by the similarity calculation section into a posterior probability. The posterior probability transformation section calculates the posterior probability calculated by using a parameter set required for calculating the posterior probability and calculated in recognition processing of each category in advance on the basis of the similarity calculated by the similarity calculation section and a category thereof.

7 Claims, 4 Drawing Sheets

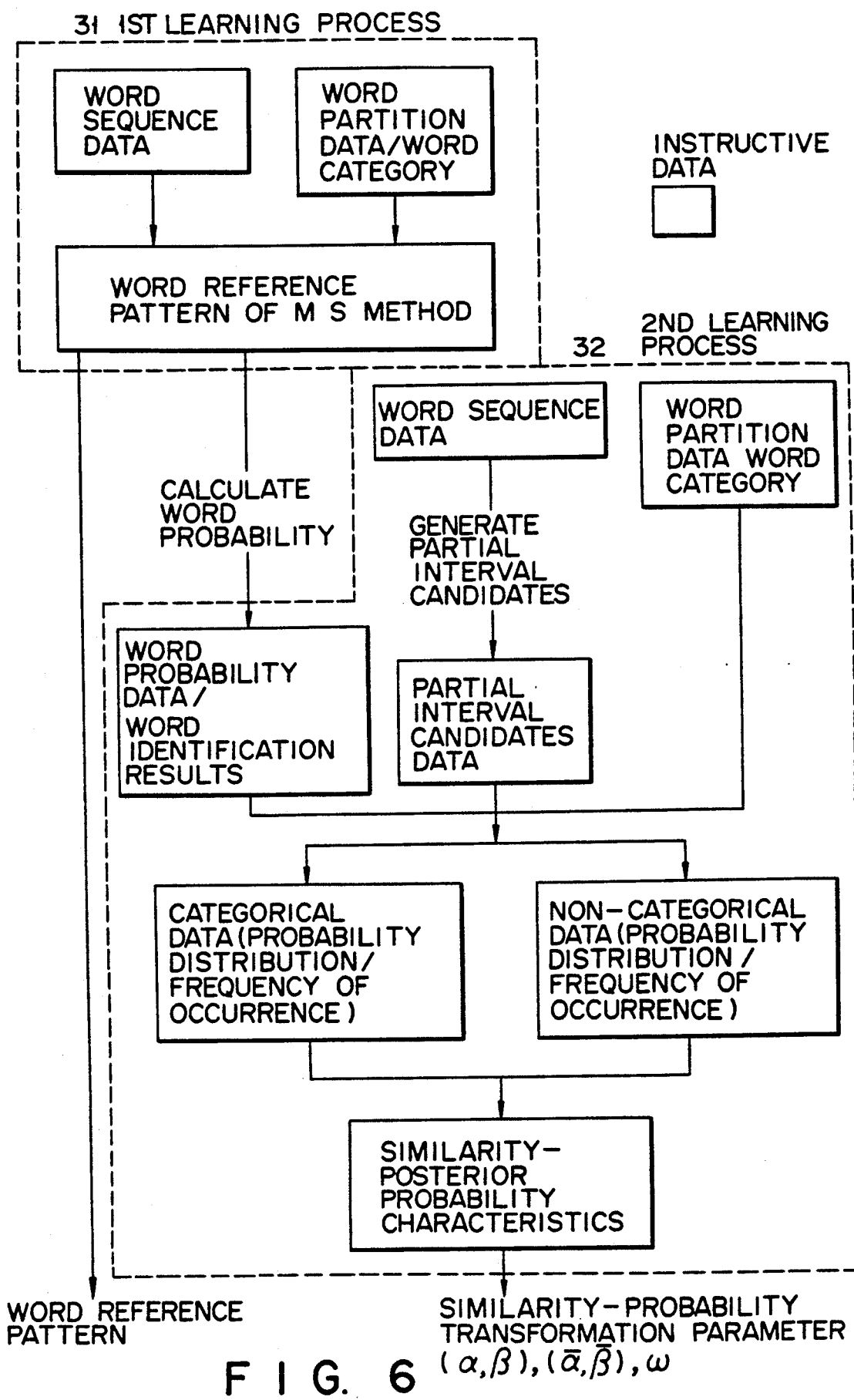
F I G. 6

PATTERN RECOGNITION SYSTEM USING POSTERIOR PROBABILITIES

BACKGROUND OF THE INVENTION

1. Field of the Invention

The present invention relates to a pattern recognition system capable of improving recognition accuracy by combining posterior probabilities obtained from similarity values (or differences between reference patterns and input patterns) of input acoustic units or input characters in pattern recognition such as speech recognition or character string recognition and, more particularly, to a pattern recognition system in which an a priori probability based on contents of a lexicon is reflected in a posterior probability.

2. Description of the Related Art

Known conventional pattern recognition systems recognize continuously input utterances or characters in units of word or character sequences. As one of such pattern recognition systems, a connected digit speech recognition algorithm using a method called a multiple similarity (MS) method will be described below.

Continuously uttered input utterances in a system are divided into frames of predetermined times. For example, an input utterance interval [1, m] having 1st to m-th frames as shown in FIG. 1 will be described. In preprocessing of speech recognition, a spectral change is extracted each time one frame of an utterance is input, and word boundary candidates are obtained in accordance with the magnitude of the spectral changes. That is, a large spectral change can be considered a condition of word boundaries. In this case, the term "word" means a unit of an utterance to be recognized. The referred speech recognition system is composed of a hierarchy of lower to higher recognition levels, e.g., a phoneme level, a syllable level, a word level and a sentence level. The "words" as units of utterances to be recognized correspond to a phoneme, a syllable, a word, and a sentence at the corresponding levels. Word recognition processing is executed whenever the word boundary candidate is obtained.

In the word sequence recognition processing, the interval [1, m] is divided into two partial intervals, i.e., intervals [1, ki] and [ki, m]. ki indicates the frame number of the i-th word boundary candidate. The interval [1, ki] is an utterance interval corresponding to a word sequence $\overline{wi}$, and the interval [ki, m] is a word utterance interval corresponding to a single word wi. A word sequence Wi is represented by:

$$Wi = \overline{wi} + wi \tag{1}$$

and corresponds to a recognition word sequence candidate of the utterance interval [1, m] divided by the i-th frame. The recognition word sequence candidates Wi are obtained for all the word boundary candidates ki (i=1, 2, . . . , l). Of these candidates thus obtained, a word sequence W having a maximum similarity value (value representing a similarity of this pattern with respect to a reference pattern) is adopted as a recognition word sequence of the utterance interval [1, m]. Note that l represents the number of recognition word sequence candidates corresponding to partial intervals to be stored upon word sequence recognition and is a parameter set in the system. By sequentially increasing m by this algorithm, recognition word sequences corresponding to all the utterance intervals can be obtained.

In the above continuous speech recognition method, the number of input words is unknown. Therefore, in order to correctly recognize an input utterance pattern L as a word sequence W, whether each detected interval correctly corresponds to an uttered word must be considered. Even if this is considered, it is difficult to obtain a high recognition rate in the word sequence recognition as long as the similarity values are merely combined. This is because the similarity is not a probabilistic measure.

Therefore, some conventional systems transform an obtained similarity value into a posterior probability and use this posterior probability as a similarity measure for achieving higher accuracy than that of the similarity.

Assume that speech recognition is to be performed for an input word sequence $$W = w1 \, w2 \ldots wn \quad wi \in C$$

including n words belonging to word set $C = \{c1, c2, \ldots, cN\}$ so as to satisfy the following two conditions:

(1) A word boundary is correctly recognized.
(2) The word category of each utterance interval is correctly recognized.

In this case, as shown in FIG. 2, assume that each word wi corresponds to a pattern li in each partial utterance interval to satisfy the following relation:

$$L = l1 \, l2 \ldots ln$$

In this case, if the word sequence W has no grammatical structure, wi and wj can be considered independent events ($i \neq j$). Hence the probability that each utterance interval is correctly recognized to be a corresponding word is represented by the following equation:

$$P\left(W|L\right) = \sum_{i=1}^{n} P(wi|li) \tag{2}$$

In this equation, P(W|L) is called likelihood. Upon calculation of the P(W|L), in order to prevent repetition of multiplication, logarithms of both sides of equation (2) are often taken to obtain logarithmic likelihood as follows:

$$\log P\left(W|L\right) = \sum_{i=1}^{n} \log P(wi|li) \tag{3}$$

In this equation, P(wi|li) is a conditional probability that an interval li corresponds to wi and is a posterior probability to be obtained.

Therefore, by transforming an obtained similarity value into a posterior probability by a table, a high recognition rate can be obtained.

Since it is practically difficult to obtain the posterior probability P(wi|li), however, a similarity value is normally used instead of a probability value, while properly biasing the similarity value to make it approximate to a probability value. For example, Ukita et al. performed approximation by an exponential function as shown in FIG. 3 ("A Speaker Independent Recognition Algorithm for Connected Word Boundary Hypothesizer," Proc. ICASSP, Tokyo, April, 1986):

$$P = \begin{array}{ll} A \cdot B^S & (S < Smax) \\ 1 & (\text{otherwise}) \end{array} \qquad (4)$$

A logarithm of the equation (4) is calculated and the relation $A \cdot B^{Smax} = 1.0$ is utilized to obtain the following equation:

$$\log P = \begin{array}{ll} S - Smax & (S < Smax) \\ 0 & (\text{otherwise}) \end{array} \qquad (5)$$

By subtracting a fixed bias Smax from similarity S, a similarity value is transformed into a probability value. When this measure is used in connected digit speech recognition, the bias Smax is set to be 0.96.

A posterior probability curve, however, is not generally a fixed curve but a variable one depending on a size of a lexicon or the contents of the lexicon (e.g., the number of similar words is large). Therefore, the conventional method of transforming a similarity value into a posterior probability on the basis of only one fixed curve as described against many applications cannot perform recognition with high accuracy.

As described above, in the conventional pattern recognition system for estimating similarity by transforming the similarity into a posterior probability, a transformation curve for obtaining the posterior probability is approximated to a fixed curve because it is difficult to obtain a curve corresponding to the contents of a lexicon or the number of words. Therefore, recognition cannot be performed with high accuracy.

SUMMARY OF THE INVENTION

It is an object of the present invention to provide a pattern recognition system capable of performing recognition with high accuracy by performing similarity-posterior transformation on the basis of a parameter easily obtained by learning the training data belonging to the lexicon.

The pattern recognition system according to the present invention performs posterior probability transformation processing for transforming a similarity value calculated from the feature vectors of an input pattern and a reference pattern for each category into a posterior probability calculated on the basis of the recognized category, the calculated similarity and a transformation parameter acquired from learning in advance.

The transformation parameter is a parameter set including parameters for defining a distribution of similarities of correctly recognized input patterns in recognition processing acquired from the similarity value training data of each category, parameters for defining a distribution of similarities of erroneously recognized input patterns in the recognition processing, and a weighting coefficient $\omega$ required for calculating the posterior probability from the distributions of the two parameters. In transformation calculation, the posterior probability is calculated on the basis of the similarity value calculated and the above transformation parameter set.

That is, in the pattern recognition process, predetermined calculation is performed by using transformation parameters corresponding to the recognition result, thereby transforming a similarity value into a desired posterior probability. In addition, the transformation requires complicated calculations. Therefore, by setting the calculation results into a table in advance, a processing speed can be increased.

Therefore, according to the pattern recognition system of the present invention, a correct posterior probability transformation parameter can be obtained by a small number of samples, and the accuracy of recognition processing can be greatly improved by using the parameters.

BRIEF DESCRIPTION OF THE DRAWINGS

FIG. 6 is a flow chart showing parameter learning steps of the similarity-posterior probability transformation section of the system shown in FIG. 4.

DETAILED DESCRIPTION OF THE PREFERRED EMBODIMENT

Figure 1:
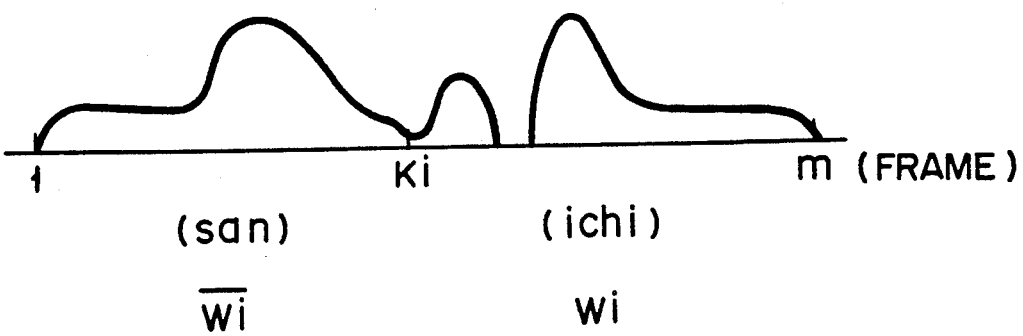
FIG. 1 is a view for explaining an input utterance interval and a word boundary candidate.
Figure 2:
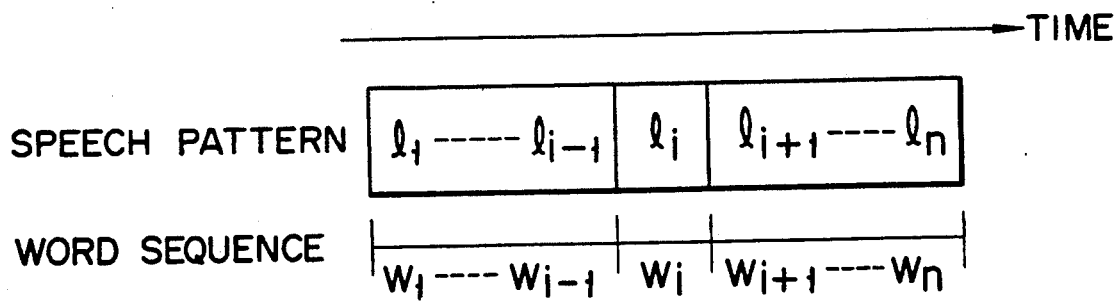
FIG. 2 is a view showing a correspondence between an utterance pattern and a word sequence.
Figure 3:
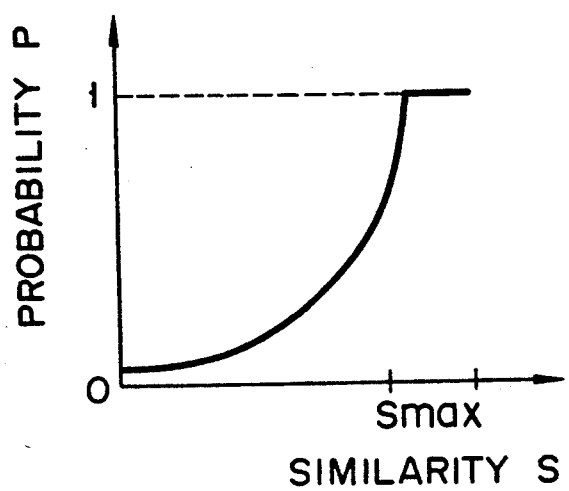
FIG. 3 is a graph showing an approximate transformation function used in a conventional system.

A principle of a pattern recognition system according to an embodiment of the present invention will be described below.

In the system of the present invention, posterior probability transformation processing for transforming a similarity value calculated from a feature vector of an input pattern and a reference pattern for each category into a posterior probability is typically performed by a transformation parameter memory section and a transformation calculation section to be described below or by a table having functions of the two sections.

The transformation parameter memory section stores, in units of categories, a parameter set including parameters $(\alpha, \beta)$ for defining a distribution of similarity values correctly recognized in recognition processing derived from the similarity value training data parameters $(\alpha, \beta)$ for defining a distribution of similarities erroneously recognized in the recognition processing, and a weighting coefficient $\omega$ required for calculating a posterior probability from the distributions of the two parameters.

The transformation calculation section calculates a posterior probability on the basis of a similarity value and the parameter set stored in the above transformation parameter memory section.

Assuming that a partial utterance pattern li is classified into a word recognition result as its category and a similarity value (especially, a multiple similarity), a posterior probability $P(wi|li)$ is rewritten as follows:

$$P(wi|li) \rightarrow P(wi|Ti\Lambda si) \qquad (6)$$

(where Ti is an event in which a recognized category of li in a multiple similarity method is wi, and si is a multiple similarity value of li concerning a word wi)

Relation (6) can be transformed as follows by using the Bayes' theorem:

$$P(wi|Ti \wedge si) = \frac{P(si|Ti \wedge wi) \cdot P(Ti \wedge wi)}{P(Ti \wedge wi)} = \quad (7)$$

$$P(si|Ti \wedge wi) \cdot P(Ti \wedge wi)/\{P(si|Ti \wedge wi)P(Ti \wedge wi) +$$

$$P(si|Ti \wedge \overline{wi})P(Ti \wedge \overline{wi})\} = P(si|Ti \wedge wi)/$$

$$\left\{ P(si|Ti \wedge wi) + P(si|Ti \wedge \overline{wi}) \frac{P(Ti \wedge \overline{wi})}{P(Ti \wedge wi)} \right\}$$

where $\overline{wi}$ is an event in which a pattern li does not belong to the category wi.

Statistics in the equation (7) will be described below. P(si|TiΛwi) will be described first.

P(si|TiΛwi) is a probability that an event in which a recognized category obtained in the multiple similarity method is wi and the category of input data is wi occurs. This curve can be approximated by the following equation:

$$P(si|Ti \wedge wi) = \frac{(1-si)^{\alpha-1}}{\beta^\alpha \cdot \Gamma(\alpha)} \exp\left(-\frac{(1-si)}{\beta}\right) \quad (8)$$

where α and β are parameters obtained from training data: α represents the number of components not involved in the reference pattern in the multiple similarity method; and β, its mean variance. In this parameter estimation method, as described in "Distribution of Similarity Values in Multiple Similarity Method" by Hideo Segawa et al. (Shingaku Giho PRU87-18, June 1987), an effective amount of training data for parameter estimation is only several tens of samples.

P(si|TiΛ$\overline{wi}$) will be described below.

P(si|TiΛ$\overline{wi}$) is a probability that an event in which a recognized category in the multiple similarity method is wi while the category of input data is not wi occurs. In continuous speech recognition, especially $\overline{wi}$ is problematic. Therefore, not only a combination of categories which easily causes $\overline{wi}$ to be erroneously recognized as wi, but also word contexts which are patterns not corresponding to a particular category involved in the lexicon and easily causing erroneous recognition such as:

| | | |
|---|---|---|
| (1) | Part of a certain word | |
| | (Ex) | "6 [roku]" |
| | | →"6-9 [roku-kyuu]" |
| (2) | Transient part between words | |
| | (Ex) | "3-1 [san-ichi]" |
| | | →"3-2-1 [san-ni-ichi]" |
| (3) | Combination of two word patterns | |
| | (Ex) | "2-2 [ni-ni]" |
| | | →"2 [ni]" | must be examined, and their similarity distributions must be estimated. (Within the brackets are phonetic symbols indicating how the numerals are pronounced in the Japanese language.) The similarity distribution can be approximated by the equation (8). Parameters in this similarity distribution are (αi, βi) so as to be distinguished from the parameters (αi, β8i) in the equation (8). The parameters (αi, βi) can be easily calculated similarly to the parameters (αi, βi).

P(TiΛwi)/P(TiΛ$\overline{wi}$) will be taken into consideration. This statistic corresponds to an a priori probability in the Bayes' probability and to an occurrence frequency ratio of a category. P(TiΛwi) represents a probability that an event in which a recognition result obtained by a subspace method is wi and an input pattern is wi occurs. This statistic is calculated in a learning procedure as follows:

$$P(Ti \wedge wi)/P(Ti \wedge \overline{wi}) =$$

$$\frac{\text{(frequency that events } Ti \text{ and } wi \text{ occur)}}{\text{(frequency that events } Ti \text{ and } \overline{wi} \text{ occur)}} = \omega$$

The obtained ω is a weighting coefficient.

As described above, each parameter set is a statistic which can be easily calculated by learning.

In pattern recognition, a set of necessary parameters α, β, α, β and ω are read out from the transformation parameter memory section in accordance with the obtained similarity si to perform a calculation based on the equation (7) in the transformation calculation section, thereby transforming the similarity value into a desired posterior probability. The transformation calculation section must perform complicated calculations. Therefore, by setting the results of transformation calculation into a table, a processing speed can be further increased.

As a result, a posterior probability transforming means can be constituted by a small data amount with high accuracy, thereby improving recognition accuracy.

A word sequence recognition system as the pattern recognition system according to the embodiment of the present invention based on the above principle will be described below.

Figure 4:
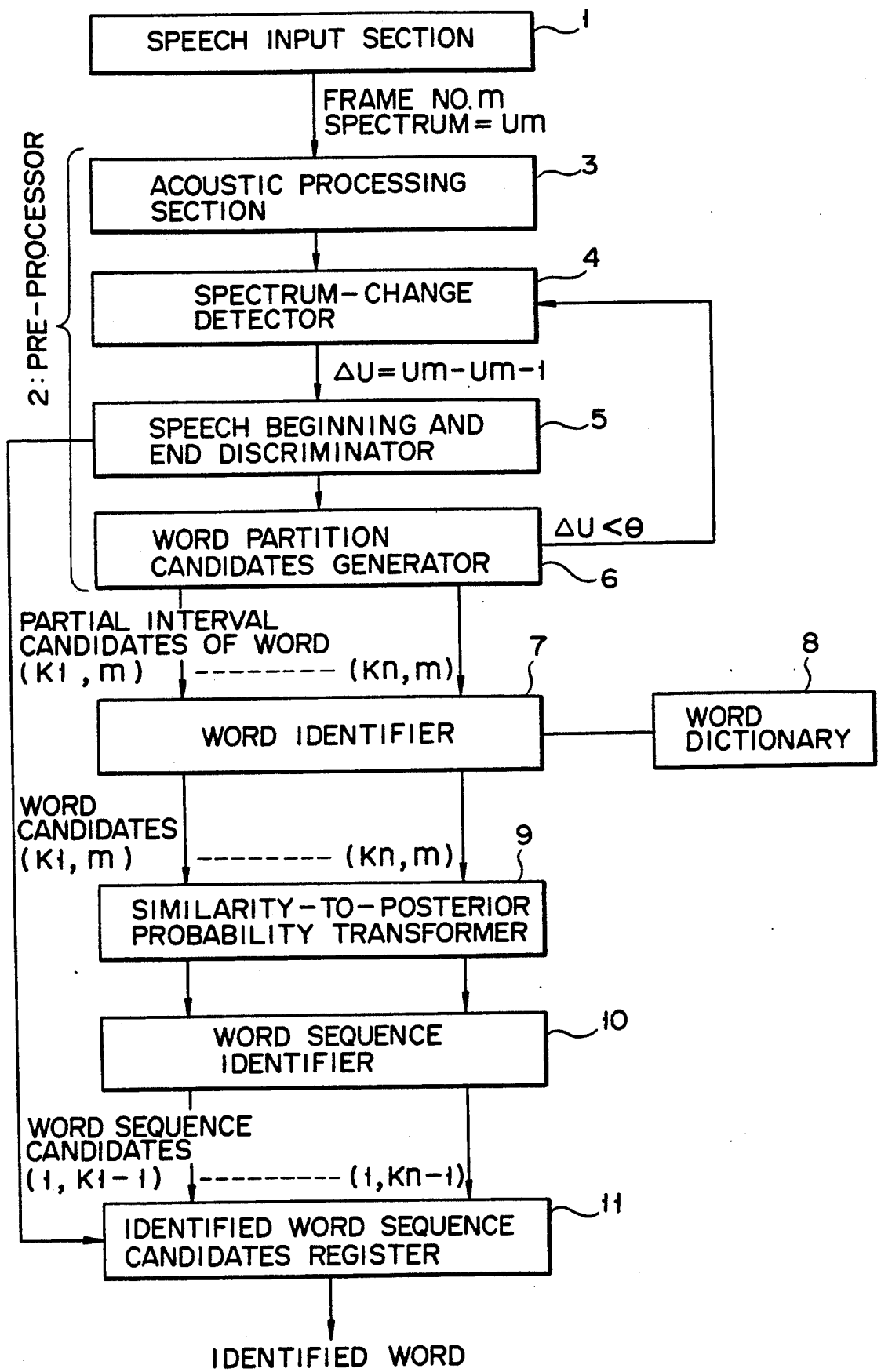
FIG. 4 is a block diagram of a continuous speech digit recognition system according an embodiment of the present invention.

FIG. 4 shows an arrangement of the word sequence recognition system for connected digit speech recognition.

Referring to FIG. 4, an utterance input section 1 transforms a continuous utterance into a predetermined electrical signal and supplies the signal to a preprocessor 2. The preprocessor 2 comprises an acoustic process section 3, a spectral change extraction section 4, an utterance start/end point determination section 5, and a word boundary candidate generation section 6. The acoustic process section 3 performs spectral analysis for the input utterance data in units of frames by using a filter bank of, e.g., 8 to 30 channels, thereby extracting a feature pattern. The spectral change extraction section 4 extracts a difference ΔU between spectrum data Um of each frame. The utterance start/end point determination section 5 detects the start and end points of the utterance on the basis of the magnitude of the extracted spectral change. When the spectral change ΔU is larger than a predetermined threshold value θ, the word boundary candidate generation section 6 outputs the corresponding frame as a word boundary candidate ki.

The feature patterns corresponding to n word interval candidates [ki, m] obtained by the boundary candidates ki (i=1 to n) are supplied to a word recognition section 7 and subjected to word recognition using a word dictionary 8 therein. A word recognition candidate of each word interval candidate is transformed into a posterior probability by a similarity-posterior probability transformation section 9 and supplied to a word sequence recognition section 10. The word sequence recognition section 10 combines a word sequence candidate for each word sequence interval [1, ki] (i=1 to n) registered in a recognition word sequence candidate registration section 11 with the similarity transformed into the posterior probability to perform word sequence recognition. Word sequence recognition candidates thus obtained are stored in the recognition word sequence candidate registration section 11. When the utterance start/end point determination section 5 detects the end point of the utterance, one of the registered word sequence candidates having a highest similarity is output as a recognized word.

Figure 5:
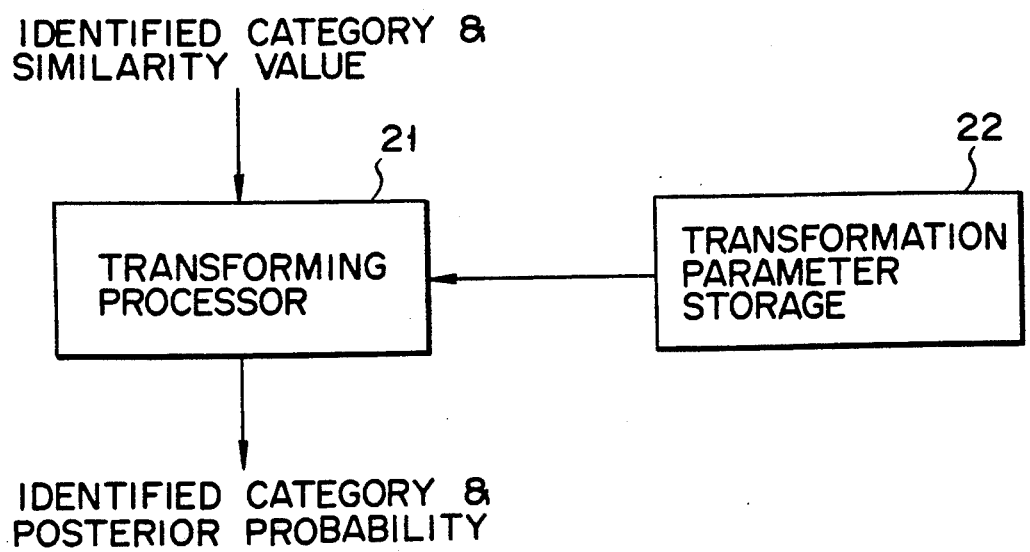
FIG. 5 is a block diagram showing an arrangement of a similarity-posterior probability transformation section of the system shown in FIG. 4.

FIG. 5 shows an arrangement of the similarity-posterior probability transformation section 9. The section 9 comprises a transformation calculation section 21 and a transformation parameter memory section 22. The transformation parameter memory section 22 is a table which stores parameters such as:

| | |
|---|---|
| $\alpha, \beta$ | similarity distribution of correct patterns |
| $\bar{\alpha}, \bar{\beta}$ | similarity distribution of incorrect patterns |
| $\omega$ | a priori probability ratio of correct pattern to incorrect pattern |

These parameter sets can be calculated by learning. FIG. 6 shows an algorithm of this learning.

That is, this learning processing includes first and second learning steps 31 and 32. In the first learning step 31, uttered word sequence data is divided or classified in accordance with word boundary data and a word category given as instructive data to form a reference pattern (template) of a word utterance based on the multiple similarity method. In the second learning step 32, a word sequence is uttered again in accordance with the word boundary data and the word category given as the instructive data to generate a word utterance interval candidate, and a word similarity calculation with respect to the reference pattern (template) formed in the above first learning step is performed on the basis of the generated word interval candidate data, thereby obtaining word similarity data and a word recognition result. On the basis of the result and the given instructive data, correct and incorrect data similarity distributions and a category appearance frequency are calculated to obtain a posterior probability curve concerning a similarity value.

Figure 7:
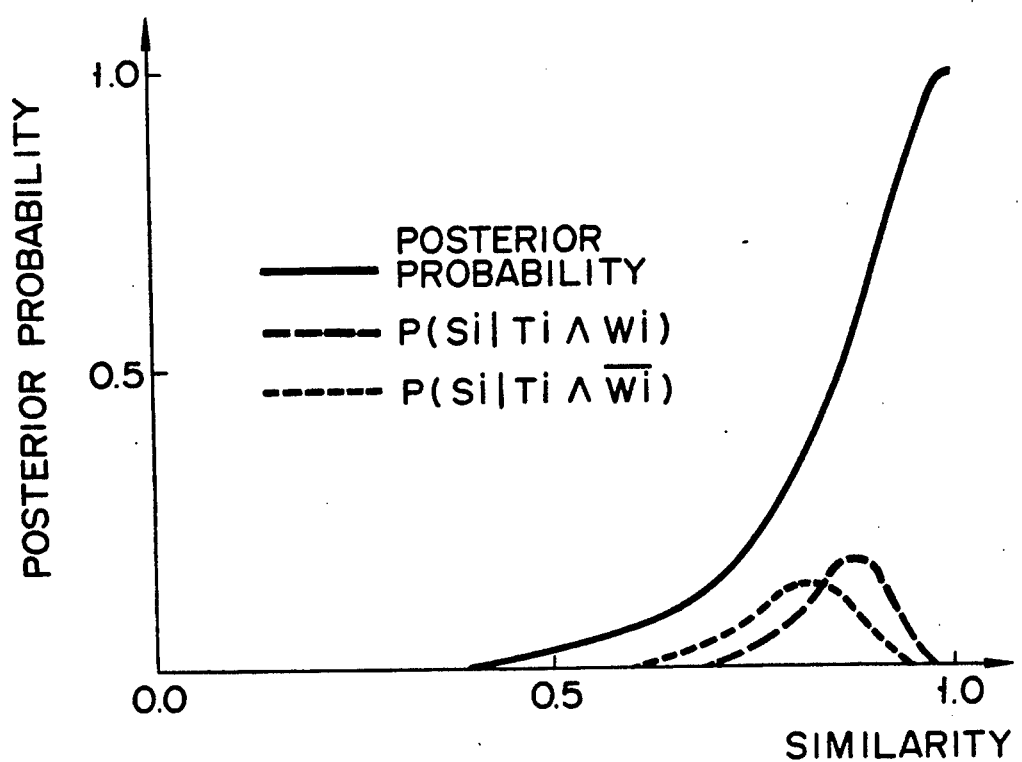
FIG. 7 is a graph showing posterior probability curves obtained in the parameter learning steps of the similarity-posterior probability transformation section of the system shown in FIG. 4.

The posterior probability curve obtained as a result of the above learning is shown in FIG. 7.

When the learning is performed for all categories, parameters ($\alpha i, \beta i, \bar{\alpha} i, \bar{\beta} i, \omega$) for all the categories can be obtained. These parameters are stored in the transformation parameter memory section 22.

The transformation calculation section 21 transforms similarities into the following equations:

$$P(si|Ti \wedge wi) = \frac{(1-si)^{\alpha-1}}{\beta i^{\alpha i} \cdot \Gamma(\alpha i)} \exp\left(-\frac{(1-si)}{\beta i}\right) \quad (9)$$

$$P(si|Ti \wedge \bar{wi}) = \frac{(1-si)^{\alpha-1}}{\beta i^{\alpha i} \cdot \Gamma(\alpha i)} \exp\left(-\frac{(1-si)}{\beta i}\right) \quad (10)$$

and then calculates the posterior probability by the following transformation equation:

$$P(wi|Ti \wedge si) = P(si|Ti \wedge wi)/\{P(si|Ti \wedge wi) + P(si|Ti \wedge \bar{wi}) \cdot \omega\} \quad (11)$$

As described above, according to the system of the present invention, the similarity-posterior probability transformation section can be easily formed by the simple learning processing, and the recognition processing can be performed with high accuracy by using the obtained transformation section.

Upon transformation into a posterior probability, different transformation curves are preferably used for the respective recognition categories. Since a common transformation curve is used depending on the recognition category result, however, the following equation may be used:

$$P = \sum_{i=1}^{N} P(Wi|Ti \wedge si)/N \quad (12)$$

In addition, since the transformation calculation section must perform complicated calculations, the transformation calculation section and the transformation parameter memory section may be combined into a table. As a result, a transformation speed can be increased.

The present invention can be applied to not only speech recognition but also another pattern recognition such as character recognition.

What is claimed is:

1. A pattern recognition system comprising:
feature extracting means for extracting a feature of an input pattern;
memory means for storing a respective reference pattern for categories of patterns to be recognized;
similarity calculating means for calculating a similarity value between the feature extracted by said feature extracting means and one of the reference patterns stored in said memory means;
posterior probability transforming means for transforming the similarity value calculated by said similarity calculating means into a posterior probability,
wherein said posterior probability transforming means includes means for calculating the posterior probability by using a parameter set required for calculating the posterior probability on the basis of the similarity value calculated by said similarity calculating means, said parameter set obtained in advance via recognition processing from training similarity value data; and
means for recognizing said input pattern on the basis of said posterior probability.

2. A pattern recognition system comprising:
feature extracting means for extracting a feature of an input pattern;
memory means for storing a respective reference pattern for categories of patterns to be recognized;
similarity calculating means for calculating similarity values between the feature extracted by said feature extracting means and the reference pattern stored in said memory means;
posterior probability transforming means for transforming at least one of the similarity values calculated by said similarity calculating means into a posterior probability,
wherein said posterior probability transforming means includes:

transformation parameter memory means for storing, for each of the categories, a parameter set including parameters for defining a distribution of similarity values correctly recognized in recognition processing derived in advance from training similarity value data, parameters for defining a distribution of similarity values erroneously recognized in the recognition processing, and a weighting coefficient required for calculating the posterior probability from the two similarity value distributions;

calculating means for calculating the posterior probability on the basis of the similarity values calculated by said similarity calculating means and the parameter set stored in said transformation parameter memory means; and means for recognizing said input pattern on the basis of said posterior probability.

3. A system according to claim 2, wherein said transformation parameter memory means includes means for storing, for each of the categories, a parameter set including parameters $a$ and $\beta$ for defining the distribution of similarity values correctly recognized in the recognition processing derived in advance from the training similarity value data, parameters $a$ and $\beta$ for defining the distribution of similarity values erroneously recognized in the recognition processing, and a weighting coefficient $\omega$ required for calculating the posterior probability from the two similarity value distributions.

4. A system according to claim 3, wherein said calculating means includes means for transforming a similarity into the following equations on the basis of the similarity value calculated by said similarity calculating means and the parameter set including $a$, $\beta$, $a$, $\beta$ and $\omega$ stored in said transformation parameter memory means:

$$P(si|Ti \wedge wi) = \frac{(1 - si)^{a-1}}{\beta i^{ai} \cdot \Gamma(ai)} \exp\left(-\frac{(1 - si)}{\beta i}\right)$$

$$P(si|Ti \wedge wi) = \frac{(1 - si)^{a-1}}{\beta i^{ai} \cdot \Gamma(ai)} \exp\left(-\frac{(1 - si)}{\beta i}\right)$$

and calculating the posterior probability by the following transformation equation:

$$P(wi|Ti \wedge si) = P(si|Ti \wedge wi)/\{P(si|Ti \wedge wi) + P(si|Ti \wedge wi) \cdot \omega\};$$

wherein:
i is an index;
Ti is an event;
wi is an input pattern; and
si is a similarity value.

5. A pattern recognition system comprising:
feature extracting means for extracting a feature of an input pattern;
memory means for storing a respective reference pattern for categories of patterns to be recognized;
similarity calculating means for calculating a similarity value between the feature extracted by said feature extracting means and one of the reference patterns stored in said memory means;

posterior probability transforming means for transforming the similarity value calculated by said similarity calculating means into a posterior probability, wherein said posterior probability transforming means includes table memory means for storing a transformation table for calculating the posterior probability calculated by using a parameter set including a parameter for defining a distribution of similarity values correctly recognized in recognition processing derived in advance from training similarity value data with respect to the reference pattern of each category on the basis of the similarity value calculated by said similarity calculating means, a parameter for defining a distribution of similarity values erroneously recognized in the recognition processing, a weighting coefficient required for calculating the posterior probability from the two similarity value distributions, and the similarity value calculated by said similarity calculating means; and means for recognizing the input pattern on the basis of the posterior probability.

6. A system according to claim 5, wherein said table memory means includes means for storing, for each of the categories, a posterior probability calculated by using the parameter set including parameters, $a$ and $\beta$ for defining the distribution of similarity values correctly recognized in the recognition processing derived from training similarity value data of each category, parameters $a$ and $\beta$ for defining the distribution of similarity values erroneously recognized in the recognition processing, a weighting coefficient $\omega$ required for calculating the posterior probability from the two similarity value distributions, and the similarity value calculated by said similarity calculating means.

7. A system according to claim 6, wherein said table memory means includes means for transforming a similarity into the following equations on the basis of the similarity value calculated by said similarity calculating means and the parameter set including $a$, $\beta$, $a$, $\beta$ and $\omega$ stored in said transformation parameter memory means:

$$P(si|Ti \wedge wi) = \frac{(1 - si)^{a-1}}{\beta i^{ai} \cdot \Gamma(ai)} \exp\left(-\frac{(1 - si)}{\beta i}\right)$$

$$P(si|Ti \wedge wi) = \frac{(1 - si)^{a-1}}{\beta i^{ai} \cdot \Gamma(ai)} \exp\left(-\frac{(1 - si)}{\beta i}\right)$$

and storing the posterior probability calculated by the following transformation equation:

$$P(wi|Ti \wedge si) = P(si|Ti \wedge wi)/\{P(si|Ti \wedge wi) + P(si|Ti \wedge wi) \cdot \omega\};$$

wherein:
i is an index
wi is an input pattern; and
si is an similarity value.

* * * * *